(12) United States Patent
Klare et al.

(10) Patent No.: US 7,588,796 B2
(45) Date of Patent: Sep. 15, 2009

(54) METHOD OF MAKING A COMPOSITE MEMBRANE

(75) Inventors: Robert J. Klare, St. Joseph, MO (US); James DeYoung, Durham, NC (US); James B. McClain, Raleigh, NC (US)

(73) Assignee: BHA Group, Inc., Kansas City, MO (US)

( * ) Notice: Subject to any disclaimer, the term of this patent is extended or adjusted under 35 U.S.C. 154(b) by 551 days.

(21) Appl. No.: 11/077,652

(22) Filed: Mar. 11, 2005

(65) Prior Publication Data
US 2006/0204654 A1 Sep. 14, 2006

(51) Int. Cl.
*B05D 7/22* (2006.01)
(52) U.S. Cl. .................. 427/115; 204/252; 204/296; 525/199; 525/200; 427/230; 427/402; 427/430.1
(58) Field of Classification Search ................ 204/252; 525/199; 429/12
See application file for complete search history.

(56) References Cited

U.S. PATENT DOCUMENTS

| | | | |
|---|---|---|---|
| 4,902,308 A | 2/1990 | Mallouk et al. | |
| 4,954,388 A | 9/1990 | Mallouk et al. | |
| 5,082,472 A | 1/1992 | Mallouk et al. | |
| 5,094,895 A | 3/1992 | Branca et al. | |
| 5,183,545 A | 2/1993 | Branca et al. | |
| 5,209,850 A | 5/1993 | Abayasekara et al. | |
| 5,547,551 A | 8/1996 | Bahar et al. | |
| 5,599,614 A | 2/1997 | Bahar et al. | |
| 5,739,223 A | 4/1998 | DeSimone | |
| 5,976,380 A | 11/1999 | Moya | |
| 6,110,333 A * | 8/2000 | Spethmann et al. | 204/252 |
| 6,228,477 B1 | 5/2001 | Klare et al. | |
| 6,252,000 B1 * | 6/2001 | O'Brien | 525/199 |
| 6,270,844 B2 | 8/2001 | McClain et al. | |
| 6,410,084 B1 | 6/2002 | Klare et al. | |
| 6,676,993 B2 | 1/2004 | Klare | |
| 6,854,603 B2 | 2/2005 | Klare | |
| 2004/0059717 A1 | 3/2004 | Klare et al. | |

FOREIGN PATENT DOCUMENTS

JP 0 456 939 A1 11/1991
WO WO 2004/026575 * 4/2004

* cited by examiner

*Primary Examiner*—Michael Barr
*Assistant Examiner*—Andrew Bowman
(74) *Attorney, Agent, or Firm*—Armstrong Teasdale LLP (57) ABSTRACT

A method of making a composite membrane with ion exchange properties includes, in an exemplary embodiment, forming a porous membrane from a first material, dissolving a coating material in a fluid at supercritical conditions, and exposing the porous membrane to the coating material dissolved in the supercritical fluid. The method also includes precipitating a uniform coating of the coating material onto an exterior surface of the porous membrane by changing the supercritical conditions of the fluid to a non-supercritical condition, and applying an ion exchange material to the coated porous membrane so that the ion exchange material is in intimate contact with substantially all of the coated surfaces of the porous membrane.

17 Claims, 5 Drawing Sheets

METHOD OF MAKING A COMPOSITE MEMBRANE

BACKGROUND OF THE INVENTION

This invention relates generally to composite porous membranes, and more particularly to, composite porous membranes compatible with ion exchange materials.

It is known that a porous membrane may have at least one property that is limited by the material from which the membrane is made. For example, a porous membrane made from expanded polytetrafluoroethylene (ePTFE) material has excellent hydrophobic properties, has low surface energy, and is extremely inert. Therefore, most materials are difficult to chemically or mechanically attach or connect to ePTFE.

U.S. Pat. No. 5,976,380 discloses a hydrophilic coating on a surface of a porous polytetrafluoroethylene (PTFE) membrane by wetting the membrane with the solution, applying the solution under pressure or pre-wetting the membrane with a wetting agent such as methanol, ethanol, isopropanol or acetone. U.S. Pat. Nos. 6,228,447; 6,410,084 6,676,993, and 6,854,603 disclose an improved membrane structure that is air permeable and treated to protect the ePTFE membrane from oil contamination by treating the surfaces and pores of the membrane. U.S. Pat. No. 6,270,844 discloses a method of impregnating a porous polymer substrate with supercritical fluid.

U.S. Pat. Nos. 5,547,551; 5,599,614 and 5,635,041 disclose a composite membrane for fuel cell application. The composite membrane includes an ePTFE membrane with its pores filled with an ion exchange material. Such a membrane can suffer from development of "pin holes" when ion exchange material separates from the surfaces defining the pores in the membrane. Pin holes have a detrimental effect on the performance of the composite membrane.

U.S. Pat. No. 4,469,744 discloses protective clothing containing a layer of highly fluorinated ion exchange polymer. A microporous polytetrafluoroethylene (PTFE) film has a solution of ion exchange material applied with the use of a vacuum. U.S. Pat. No. 4,902,308 discloses a film of porous expanded PTFE with exterior and interior surfaces coated with a metal salt of perfluoro-cation exchange polymer. U.S. Pat. No. 4,954,388 discloses a multi-layer composite membrane having a film of continuous ion exchange polymer attached to a reinforcing fabric by means of an interlayer of porous expanded PTFE. A coating of an ion exchange resin was present on at least a portion of the interior and exterior surfaces of the fabric and porous ePTFE.

U.S. Pat. No. 5,082,472 discloses a composite membrane of microporous film in laminar contact with a continuous ion exchange resin layer wherein both layers have similar area dimensions. Surfaces of internal nodes and fibrils of ePTFE may be coated with ion exchange resin coating. The ePTFE layer of this composite membrane imparts mechanical strength to the composite structure. U.S. Pat. Nos. 5,094,895 and 5,183,545 disclose a composite porous liquid-permeable article having multiple layers of porous ePTFE bonded together with interior and exterior surfaces coated with an ion exchange polymer.

BRIEF DESCRIPTION OF THE INVENTION

In one aspect, a method of making a composite membrane with ion exchange properties is provided. The method includes providing a porous membrane having a plurality of pores and made from a first material, dissolving a coating material in a fluid comprising densifed gas, and exposing the porous membrane to the coating material dissolved in the densified gas. The method also includes depositing a uniform coating of the coating material onto surfaces defiining the pores in the porous membrane by changing the supercritical conditions of the fluid to a non-supercritical condition, and applying an ion exchange material to the coated porous membrane so that the ion exchange material is in contact with substantially all of the coated surfaces of the porous membrane. The ion exchange material is substantially incompatible with the first material of the porous base membrane, and the coating material is substantially compatible with the first material and the ion exchange material.

In another aspect, a method of making a proton exchange membrane for a fuel cell is provided. The method includes providing a porous base membrane comprising a plurality of pores and made from a first material, entraining a coating material in a fluid comprising a densifed gas, and exposing the porous base membrane to the coating material entrained in the densified gas. The method also includes depositing a uniform coating of the coating material onto an exterior surface of the porous base membrane by changing the conditions of the densified gas to below a solubility limit of the coating material in the densified gas, and applying an ion exchange material to the coated porous membrane so that the ion exchange material is in contact with substantially all of the coated surfaces of the porous base membrane. The ion exchange material is substantially incompatible with the first material of the porous base membrane, and the coating material is substantially compatible with the first material and the ion exchange material.

In another aspect, a method of making a composite membrane is provided. The method includes providing a porous base membrane having a plurality of pores and made from a first material, entraining a coating material in a fluid comprising a densifed gas, exposing the porous base membrane to the coating material entrained in the densified gas, and depositing a uniform coating of the coating material onto surfaces defining the pores of the porous base membrane by changing the conditions of the densified gas to below a solubility limit of the coating material in the densified gas. The coating material including at least one of fluorinated vinyl-based copolymers having sulfonyl functionality, fluorinated acrylic-based copolymers having at least one of hydroxyl groups, acid groups, sulfonyl groups, and sulfonic acid groups, and fluorinated styrenic-based copolymers having at least one of hydroxyl groups, acid groups, sulfonyl groups, and sulfonic acid groups.

DETAILED DESCRIPTION OF THE INVENTION

A composite membrane and a method of making the composite membrane are discussed in detail below. The composite membrane can be used in filter apparatus or can be used, with the addition of an ion exchange, as a proton exchange membrane material in a fuel cell. The composite membrane includes, in an exemplary embodiment, a porous base membrane having a plurality of pores and a coating applied to the base membrane using a densified gas, for example, a supercritical fluid or a near critical fluid, as a solvent. The coating is deposited onto the base membrane without blocking the pores of the membrane by changing the conditions of the supercritical fluid, for example, temperature and/or pressure. An ion exchange material can then be applied to the coated surface of the membrane. The coating used is selected to be compatible with the material of the base membrane. By compatible it is meant that the coating material will "wet-out" the surface of the base membrane to form a continuous, conformal coating substantially free of voids and/or "pin holes". The coating is also selected to be compatible with the ion exchange material thereby permitting the ion exchange material to wet-out the internal and external surfaces of the coated membrane and impregnate the pores of the coated base membrane.

Figure 1:
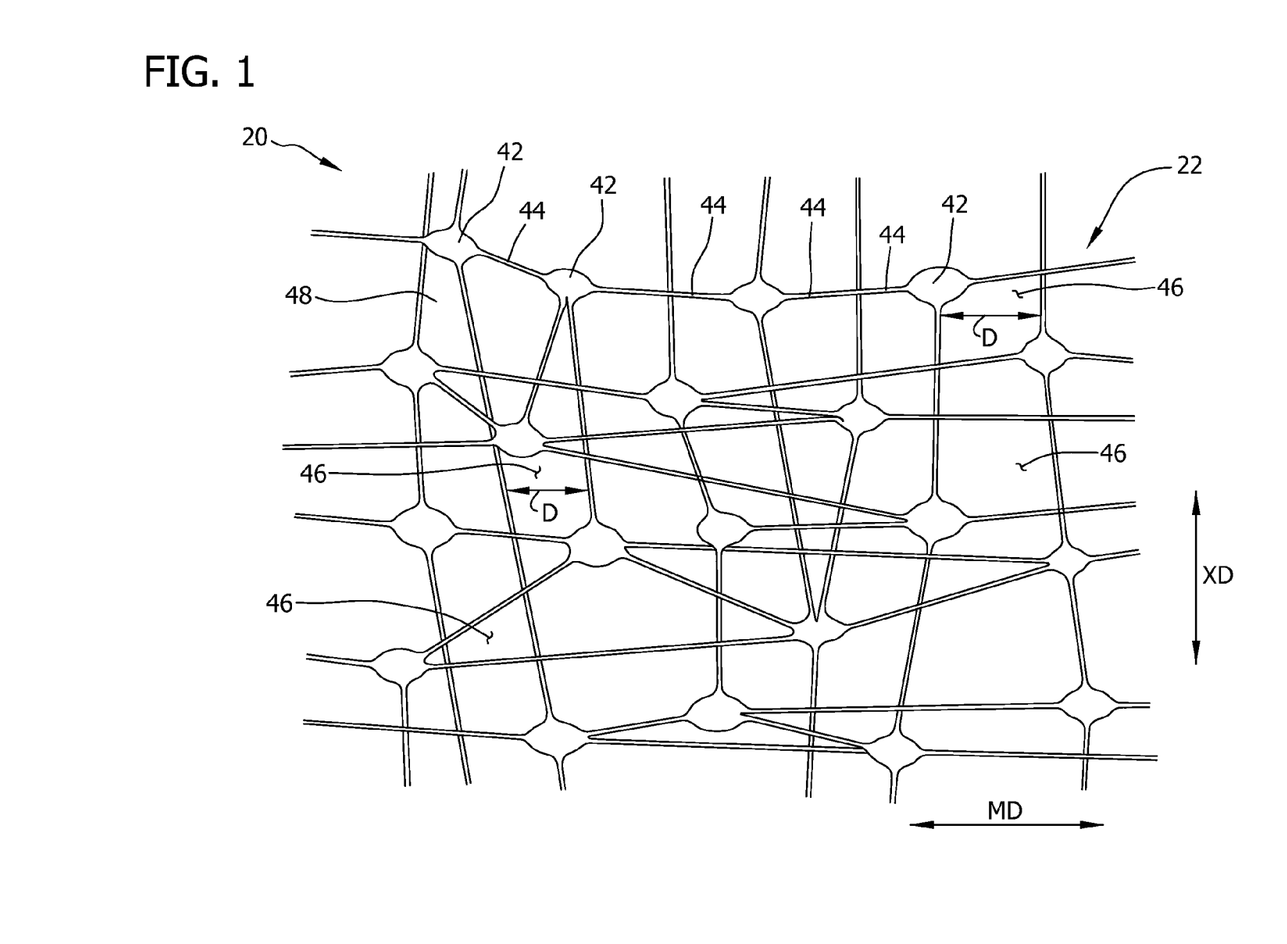
FIG. 1 is a plan schematic view of a composite membrane in accordance with an embodiment of the present invention.
Figure 2:
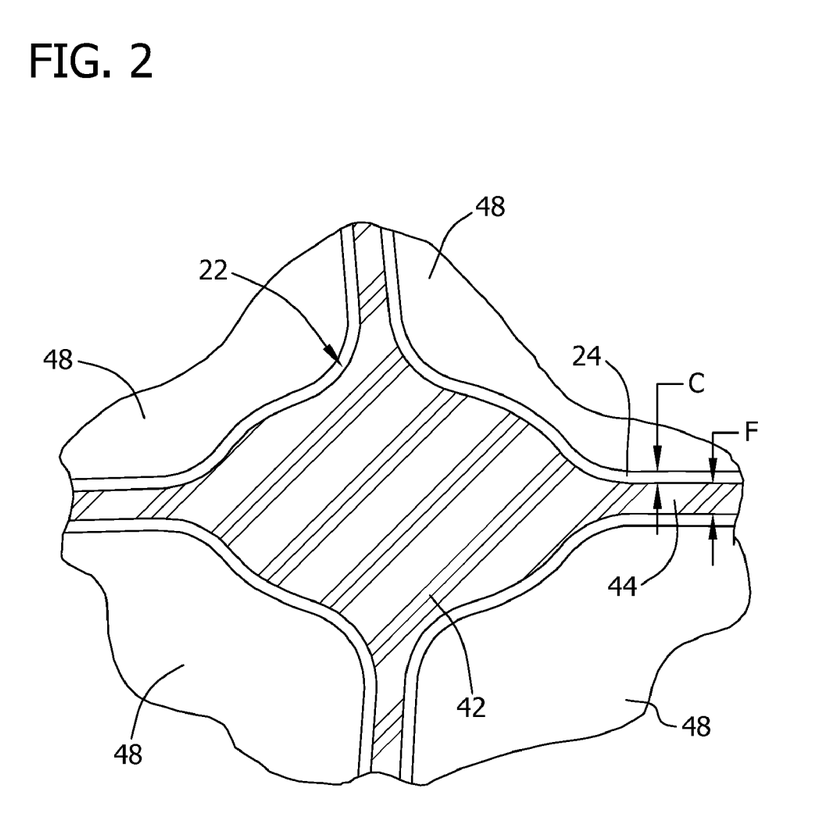
FIG. 2 is an enlarged sectional schematic view of a portion of the membrane shown in FIG. 1.

Referring to the drawings, FIG. 1 is a plan view of a composite membrane 20 in accordance with an embodiment of the present invention and FIG. 2 is an enlarged sectional view of a portion of membrane 20. In an exemplary embodiment, composite membrane 20 includes a porous base membrane 22 that is microporous. Base membrane 22 is made from any suitable material, for example, expanded polytetrafluoroethylene (ePTFE). A porous ePTFE membrane 22 has excellent hydrophobic properties, a low surface energy, and is chemically inert. A coating layer 24 is formed on porous base membrane 22 by any suitable coating that would change or modify at least one property or characteristic of base membrane 22, such as, without limitation, hydrophilicity, electrical conductivity, ion conductivity or compatibility with another material. By compatible it is meant that coating material will "wet-out" the surface of base membrane 22 to form a continuous, conformal coating layer 24 substantially free of voids and/or "pin holes".

There are numerous uses for a porous membrane having a property or characteristic that has been changed or modified. For example, composite membrane 20 can be used as a proton exchange membrane (PEM) in a fuel cell. Coating 24 permits porous base membrane 22 to receive an ion exchange material to enhance performance and durability for use as a PEM. In alternate embodiments, applying an appropriate coating 24 to base membrane 22, permits composite membrane 20 to be employed in other applications, including but not limited to liquid filtration, polarity-based chemical separations, electrolysis, batteries, pervaporization, gas separation, dialysis separation, industrial electrochemistry such as chloralkali production and electrochemical applications, super acid catalysts, or use as a medium in enzyme immobilization.

In the exemplary embodiment, base membrane 22 is porous, and in one embodiment microporous, with a three-dimensional matrix or lattice type structure including a plurality of nodes 42 interconnected by a plurality of fibrils 44. Surfaces of nodes 42 and fibrils 44 define a plurality of pores 46 in membrane 22. Membrane 22 is made from any suitable material, and in the exemplary embodiment is made of expanded polytetrafluoroethylene (ePTFE) that has been at least partially sintered. Generally, the size of a fibril 44 that has been at least partially sintered is in the range of about 0.05 micron to about 0.5 micron in diameter taken in a direction normal to the longitudinal extent of the fibril. The specific surface area of porous base membrane 22 is in the range of about 9 square meters per gram of membrane material to about 110 square meters per gram of membrane material.

Surfaces of nodes 42 and fibrils 44 define numerous interconnecting pores 46 that extend completely through membrane 22 between opposite major side surfaces in a tortuous path. In the exemplary embodiment, the average effective pore size of pores 46 in base membrane 22 is sufficient to be deemed microporous, but any pore size may be used in alternate embodiments. A suitable average effective pore size D for pores 46 in base membrane 22 is in the range of about 0.01 micron to about 10 microns, and in another embodiment, in the range of about 0.1 micron to about 5.0 microns.

In the exemplary embodiment, base membrane 22 is made by extruding a mixture of polytetrafluoroethylene (PTFE) fine powder particles and lubricant. The extrudate is then calendered. The calendered extrudate is then "expanded" or stretched in at least one and preferably two directions, MD and XD, to form fibrils 44 connecting nodes 42 to define a three-dimensional matrix or lattice type of structure. "Expanded" is intended to mean sufficiently stretched beyond the elastic limit of the material to introduce permanent set or elongation to fibrils 44. Base membrane 22 is then heated or "sintered" to reduce and minimize residual stress in the membrane material by changing portions of the material from a substantially crystalline state to a substantially amorphous state. In an alternate embodiment, base membrane 22 is unsintered or partially sintered as is appropriate for the contemplated end use of the membrane.

Other suitable materials and methods can be used to form base membrane 22 having an open pore structure. For example, other suitable materials that can be used to form base membrane 22 include, but are not limited to, polyolefin, polyamide, polyester, polysulfone, polyether, acrylic and methacrylic polymers, polystyrene, polyurethane, polypropylene, polyethylene, polyphenelene sulfone, cellulosic polymer and combinations thereof. Other suitable methods of making base membrane 22 include foaming, skiving or casting any of the suitable materials. In alternate embodiments, base membrane 22 is formed from woven or non-woven fibers of the above described materials, such as PTFE.

In one exemplary embodiment, composite membrane 20 further includes an ion exchange material 48 applied to coating 24 on base membrane 22. In this exemplary embodiment, ion exchange material 48 substantially fills pores 46 and adheres to coating 24. Any suitable ion exchange material 48 can be used, for example, a polytetrafluoroethylene ionomer having sulfonic or carboxylic ionic functional groups such as, NAFION®, commercially available from E.I. DuPont de Nemours & Co. Other perfluoroalkyl-based ionomers useful as ion exchange material 48 include, but are not limited to Aciplex®, Flemion®, and other fluorocarbon ionomers from Dow Chemical Corporation. Suitable non-fluorocarbon-based ionomers for use as ion exchange material 48 include, but are not limited to sulfonated aromatic polymers, such as sulfonated polystyrene, sulfonated styrene grafted to polyvinylidene difluoride-based polymers, sulfonated polyethersulfone, sulfonated poly(ether etherketones) (PEEK) and sulfonated poly(phenylene sulfide).

Base membrane 22 contains many interconnected pores 46 that fluidly communicate with environments adjacent to the opposite facing major sides of base membrane 22. Therefore, the propensity of ion exchange material 48 to flow into and impregnate pores 46 of the PTFE material of base membrane 22, is a function of the surface energy of base membrane 22, the surface tension of applied ion exchange material 48, the relative contact angle between the PTFE material of base membrane 22 and ion exchange material 48, the size or effective flow area of pores 46, and the compatibility of the PTFE material of base membrane 22 and ion exchange material 48. Most ion exchange materials are incompatible with PTFE and, therefore, it is difficult to get an ion exchange material into pores of an ePTFE membrane and attach well to surfaces of base membrane 22 that define pores 46.

Composite membrane 20, thus, includes a treatment or coating 24 on surfaces of base membrane 22 that is compatible with PTFE and with an ion exchange material. Coating 24 adheres to and conforms to the surfaces of nodes 42 and fibrils 44 that define the pores 46 in base membrane 22. Coating 24, thus, improves or modifies the receptability of ion exchange material 48 to base membrane 22 greatly reducing and/or eliminating "pin holes" and enhancing durability and performance. Most ion exchange materials are incompatable with PTFE. By incompatable, it is meant that the ion exchange material does not wet out the PTFE and includes voids and/or "pin holes".

Coating 24 is a relatively thin and substantially uniform layer deposited onto base membrane 22 so that ion exchange material 48 can be more readily received by base membrane 22. In the exemplary embodiment, coating 24 is a fluorinated vinyl-based copolymer having sulfonyl functionality, for example a vinylidene difluoride (VF2) and sulfonyl fluoride functional perfluoroalkyl vinyl ether copolymer. Coating 24 is not limited to fluorocarbon vinyl-based polymers. Other exemplary coatings include vinylic-based, acrylic-based or styrenic-based polymers and copolymers. In this case, exemplary polymers are ideally partially fluorinated, having between about 20% and about 70% fluorine by weight, and have available functional groups that can be reactively or thermally converted to form strong polar hydrogen-bonding functional groups such as hydroxyl (—OH) groups, acid groups (—COOH), sulfonyl groups ($SO_2X$) where X is a halogen, or sulfonic acid groups ($SO_3H$). Other exemplary, polymers include poly(vinyl acetate)-based polymers which can be thermally or chemically treated to form poly(vinyl alcohol) polymers once deposited on base membrane 22. In some embodiments the conversion process takes place immediately subsequent to the supercritical carbon dioxide ($SCCO_2$) deposition process, as part of that process, in other embodiments, the conversion takes place after the $SCCO_2$ deposition process is completed.

In one aspect, vinylidene difluoride co-polymers are used because of the potential incorporation of highly ionic functional (hydrogen bonding) groups, for example, by incorporation of a functional co-monomer, into the polymer coating in the form of a sulfonic acid pendant group. This highly polar functional group substantially enhances the hydrophilic wetting tendencies of typically highly hydrophobic fluorocarbon polymers. In one embodiment, the polymer is synthesized in the sulfonyl fluoride form, coated onto base membrane 22 and then converted to the sulfonic acid form on base membrane 22.

Figure 3:
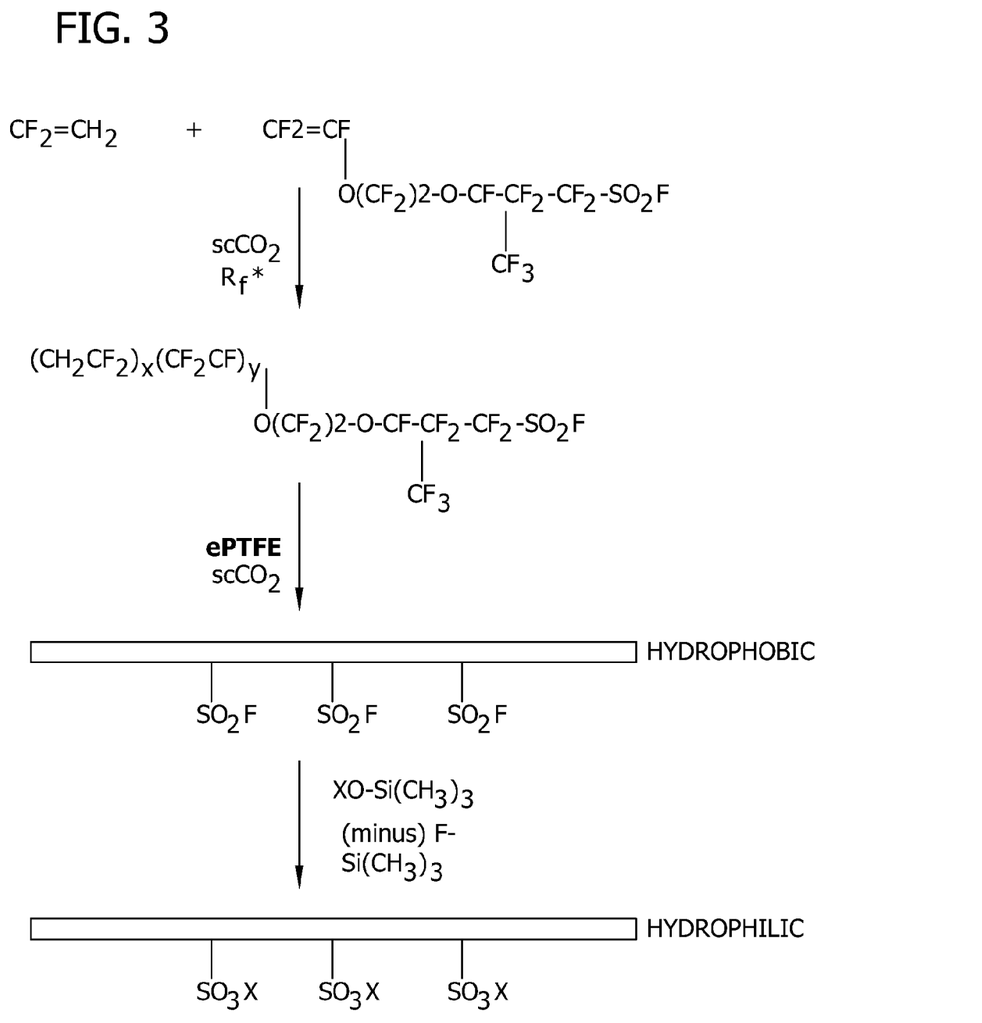
FIG. 3 is a schematic illustration of the synthesis and coating of an ionic PVDF-based coating onto the composite membrane shown in FIG. 1.

Fuorinated and semifluorinated olefin copolymers, for example, vinylidene difluoride, having sulfonyl fluoride functional perfluoroalkyl vinyl ether (PVDF-co-PSEVPE) with monomer ratios ranging from about 1:1 to about 5:1 are suitable for use as coating 24. Referring also to FIG. 3, the copolymer is entrained in a densified gas and deposited onto membrane 22. The deposited coating has hydrophobic properties and is treated to chemically convert the sulfonyl fluoride to sulfonic acid derivatives to convert the properties of the coating to hydrophilic. In one exemplary embodiment, a trimethyl silanoate sodium salt in polar solvents is used to chemically convert the sulfonyl fluoride. Once converted to the sulfonic acid derivative, the coating can be acidified to form the sulfonic acid functional coating. Both the sulfonic acid derivative and sulfonic acid functional coated membranes are wettable with neutral water and thus are hydrophilic making composite membrane 20 more compatible with ion exchange material 48.

Substantially improved and modified properties of base membrane 22 are realized when the surfaces defining pores 46 in base membrane 22 and the major side surfaces of base membrane 22 are treated with any of the materials described above to form coating 24. The primary criteria for coating 24 as described above are two-fold. Coating 24 should have an affinity for the ePTFE membrane and simultaneously have functionality that leads to affinity for the ionomer. This second functionality is generally characterized as providing strong hydrogen bonding potential such as is the case with the incorporation of hydroxyl, carboxylic acid, sulfonic acid, amide, imide, acetal, phosphoric acid, ammonium, or urethane functional groups. The limiting factor previously has been the lack of an effective way to introduce the treatment materials into pores 46 of base membrane 22 to evenly coat the surfaces of nodes 42 and fibrils 44.

A fluid having a surface tension less than about 15 dynes/cm, for example, a densified gas, can be used to entrain or dissolve the above described materials and introduce the materials into pores 46 of base membrane 22. The densified gas can be in its liquid, supercritical, or near critical state, for example, supercritical carbon dioxide ($CO_2$). The solubility of coating material 24 in supercritical carbon dioxide is determined by experimentation. In the exemplary embodiment, coating material 24 is applied in a pre-converted state where the solubility of the polymer in dense $CO_2$ is not inhibited by the presence of significant quantities of hydrogen bonding groups. Once coated onto base membrane 22 as described herein, coating 24 is converted to the polar hydrogen bonding state. The pre-converted polymer is typically dissolved in liquid or supercritical $CO_2$ in concentrations ranging between about 1 and about 15 percent by weight at temperatures typically between about 0° C. and 300° C. and pressures between about 30 bar and about 850 bar. The resulting solution is capable of wetting membrane 22 and entering pores 46 in membrane 22 with the dissolved coating material 24. The solution with dissolved coating material 24 has a surface tension, viscosity and relative contact angle that permits the dissolved coating material 24 to be easily carried into pores 46 of base membrane 22. It should be noted that liquid molecules are attracted to one another at their surfaces, and liquids with relatively high levels of inter-molecular attraction possess high surface tension. The concept of "wetting" is a function of the surface energy of a liquid ($'Y_{SL}$), surface energy of a solid ($'Y_{SA}$) and the surface tension of a liquid ($\tau_{LA}$), often described by the Young-Dupre equation below.

$$'Y_{SL} - 'Y_{SA} = \tau_{LA} * \cos(\theta) \quad (1)$$

Contact angle θ is a measure of the angle between the surface of a liquid drop and the surface of a solid taken at the tangent edge of where the liquid drop contacts the solid such that when the contact angle θ is 0°, a liquid will spread to a thin film over the solid surface. By comparison, a solid and liquid combination with a contact angle θ of 180° causes the liquid to form a spherical drop on the solid surface. When a contact angle θ between 0° and 90° exists, a liquid will "wet" the solid it is contacting and the liquid will be drawn into pores, if any, existing in the surface of a solid. When the contact angle θ is more than 90°, a liquid will not wet the solid and there will be a force needed to drive the liquid into any existing pores 46 present in base membrane 22.

In the exemplary embodiment, the solvent used for coating material 24 is carbon dioxide in a supercritical phase. The surface tension of the supercritical carbon dioxide ($SCCO_2$) solution is less than about 0.1 dyne/cm so it can enter very small areas of base membrane 22 to coat. $SCCO_2$ and mixtures of $SCCO_2$ and coating materials also have a viscosity of less than about 0.5 centipoise. The viscosity and surface tension of the resultant solution are low compared to traditional solvents so resistance to flow is reduced, thus, lending itself to entering even the smallest pores 46 of base membrane 22. Thus, it is possible to enter and coat porous base membrane 22 material with a relatively small pore size. Most solvents have a viscosity greater than 0.5 cps and a surface tension greater than about 15 dynes/cm that make it difficult to enter small pores 46 in base membrane 22 formed from ePTFE and, therefore, it is difficult to coat all the surfaces of base membrane 22 with such liquids.

Attractive properties are provided by $SCCO_2$ because it behaves like a gas and a liquid at the same time. The density of $SCCO_2$ is variable and in one embodiment ranges between about 0.4 grams/cc and about 0.95 grams/cc in its supercritical phase so it functions like a liquid solvent. When it behaves like a liquid, it can dissolve coating material 24 and act as a solvent as described above and still be pumped efficiently. When $SCCO_2$ behaves like a gas it has very low viscosity and surface tension, so it can enter very small spaces, such as relatively small pores 46 in base membrane 22 or spaces or voids in a node 42, fibril 44, or molecule forming base membrane 22.

Coating 24 is disposed on and around substantially all the surfaces of nodes 42 and fibrils 44 that define interconnecting pores 46 extending through untreated base membrane 22. In one exemplary embodiment, coating material 24 is deposited on the surfaces of nodes 42 and fibrils 44 by precipitation of coating material 24 from dense $CO_2$. In such a precipitation, particles of coating material 24 are generated and are attracted to base membrane 22. Precipitation can be affected by expansion (decrease in pressure) of the dense $CO_2$. As the fluid expands the fluid flows in 3-dimensions, and Brownian motion moves the coating particles into contact with nodes 42 and fibrils 44 surrounding pores 46. It is not necessary that coating 24 completely encapsulate the entire surface of a node 42 or fibril 44 to sufficiently modify the properties of base membrane 22. The relatively thin and uniformly even thickness C of coating 24 results from depositing numerous coating material particles on the majority of the surface area of base membrane 22, including surfaces of nodes 42 and fibrils 44. This deposition by precipitation occurs when the conditions, for example, pressure and/or temperature, of the dense $CO_2$ are changed to a level near to, or below the solubility limit of coating material 24. Such a process is described in U.S. Pat. No. 6,270,844 and U.S. patent application Ser. No. 10/255,043 which are assigned to at least one of the assignees of the present application and incorporated herein by reference.

Unlike a conventional solute precipitation process, the polymer coatings in the described method do not form 'particle-like' precipitates in the $CO_2$ fluid. As they precipitate from the low surface tension fluid the polymer stays highly swollen and the ePTFE material of base membrane remains wetted with the fluid and the $CO_2$-plasticized polymer. As such, the fully precipitated polymer forms a conformal coating around the 3-dimensional structure of base membrane 22. Process parameters are selected to control the thickness of coating 24 in the range of about 1.0 nanometer to about 500 nanometers and preferably in the range of about 1.0 nanometer to about 100 nanometers. In one embodiment, the ratio of the precipitated and deposited thickness C of coating 24 to a thickness F of fibril 22 is in the range of about 0.2% to about 40% and in another embodiment, about 0.2% to about 20%. The ratio of the precipitated and deposited thickness C of coating 24 to the effective average size D of the pores 46, in one embodiment, is in the range of about 0.2% to about 20% and in another embodiment, about 0.2% to about 10%.

The deposited coating material adheres to surfaces of nodes 42 and fibrils 44 that define the pores 46 in base membrane 22. The deposited treatment material may be further processed if needed, such as by heating or by chemical conversion such as acid catalyzed de-protection, or acid, base, or thermally induced hydrolysis or saponification, or other suitable process. Coating material 24 provides a relatively thin and uniformly even property modifier to base membrane 22 that does not completely block or "blind" pores 46. In one embodiment, the coated base membrane 22 has an air-permeability of at least about 0.10 CFM per square foot of membrane and in another embodiment, at least about 0.20 CFM per square foot of membrane measured by ASTM D737 testing. Coating 24 is used as a primer because it is compatible with ion exchange materials, for example, NAFION.

Figure 4:
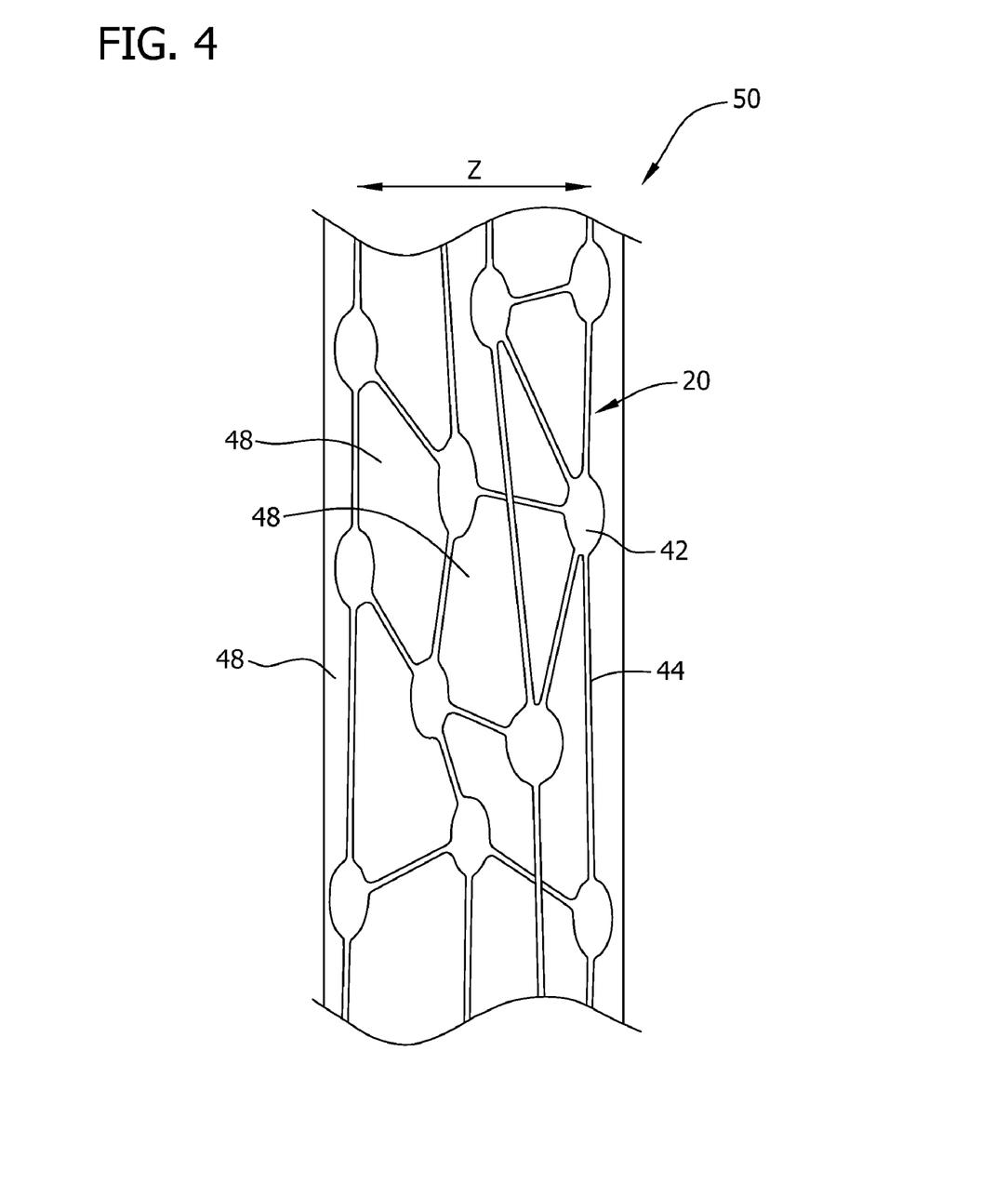
FIG. 4 is a sectional schematic illustration of a proton exchange membrane that includes the composite membrane shown in FIG. 1.

Coating 24 is selected for its ability to easily attach to, for example, ePTFE and to be receptive to ion exchange materials 48, for example, NAFION. To apply ion exchange material 48 to coated membrane 22, traditional impregnation techniques are used. For example, a solution is prepared containing ion exchange material 48 in solvent that can include one or more surfactants and that does not dissolve coating 24. In one embodiment, a surfactant is employed with the ion exchange material 48 to aid impregnation of the pores 46 of membrane 22. The solution is applied to coated base membrane 22 by any conventional coating technique including forwarding roll coating, reverse roll coating, gravure coating, doctor coating, kiss coating, as well as dipping, brushing, painting, and spraying so long as the liquid solution is able to penetrate pores 46. Excess solution from the surface of membrane 22 is removed. Composite membrane 20 is then placed into an oven to dry. Oven temperatures range from about 60° C. to about 200° C. Drying composite membrane 20 in the oven causes the ion exchange resin to become securely adhered to coating 24. Additional solution application steps, and subsequent drying, may be repeated. Alternatively, ion exchange material 48 can be applied to the membrane without the use of a surfactant. A vacuum can also be used to draw ion exchange material 48 into coated base membrane 22. Composite membrane 20 has a uniform thickness substantially free of any discontinuities or pinholes. The interior volume of base membrane 22 is occluded such that composite membrane 20 is resistant to flow of non-polar gases and to flow of liquids, such as water. Composite membrane 20 provides a relatively high ion transport rate and exhibits sufficient strength and physical properties. FIG. 4 is a schematic illustration of a proton exchange membrane 50 that includes composite membrane 20.

Figure 5:
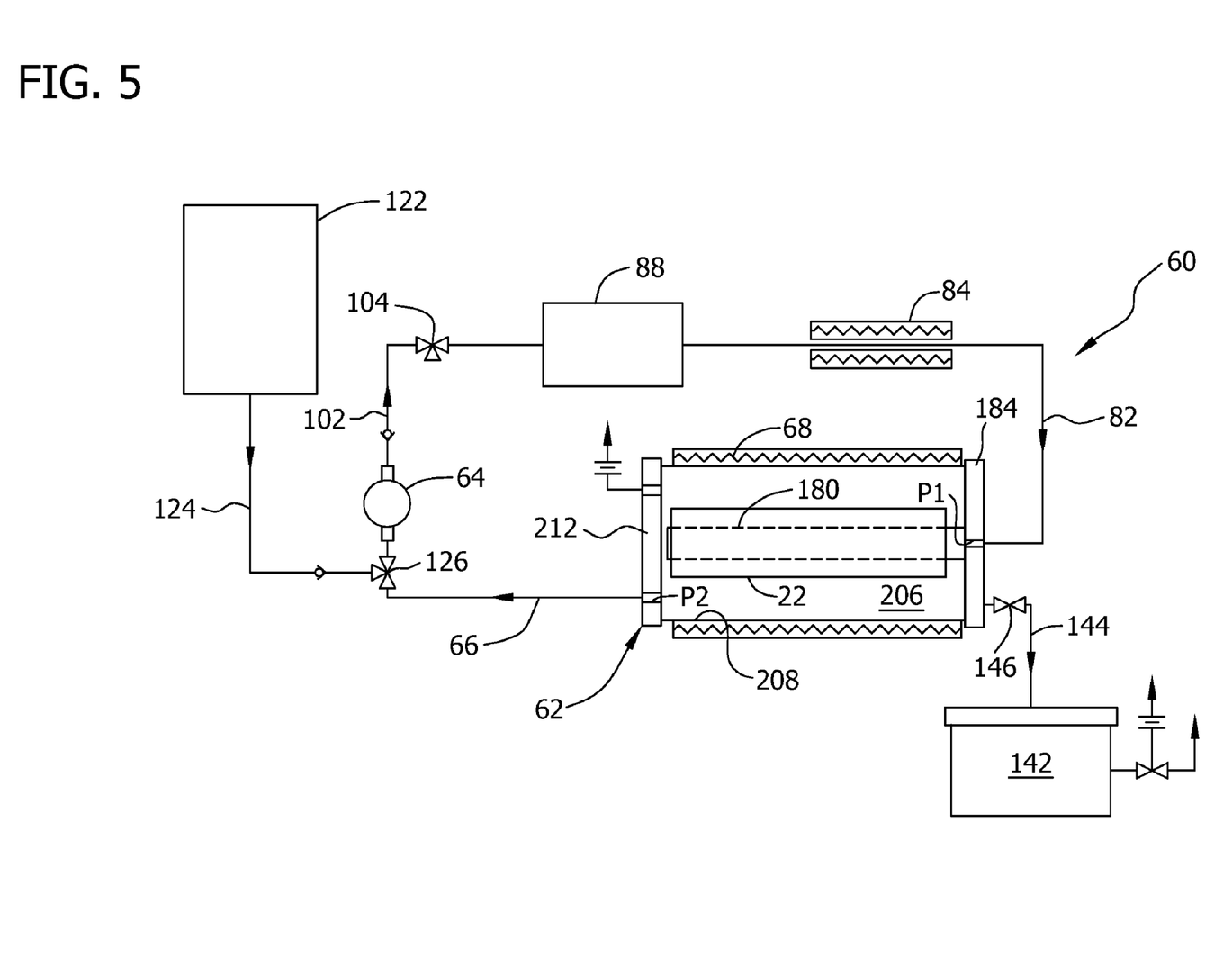
FIG. 5 is a schematic illustration of the coating equipment used to make the composite membrane shown in FIG. 1.

FIG. 5 is a schematic illustration of a supercritical fluid coating apparatus 60 used to apply coating 24 to base membrane 22. In an exemplary embodiment, coating apparatus 60 includes a treatment vessel 62 for applying coating 24 to base membrane 22. Treatment vessel 62 is capable of withstanding pressure up to about 12,320 psi (about 850 bar) and temperature in the range of about 0° C. to about 300° C. (32° F. to 572° F.). Treatment vessel 62 is sized appropriately such that the desired dimensions of base membrane 22 can fit into the treatment vessel housing. Treatment vessel 62 is fluidly connected to a supply and circulation pump 64 by line 66. Treatment vessel 62 has a heater 68 to maintain the walls of treatment vessel 62 at a predetermined temperature. Treatment vessel 62 is located in a fluid circulation loop connected by line 82 to a coating introduction vessel 88. Coating introduction vessel 88 is connected to pump 64 through line 102 and valve 104. Any or all of lines 82, 102 and vessels 62, 88 can be heated or cooled to maintain predetermined process conditions.

Pump 64 is also connected to a solvent storage container 122 through line 124 and valve 126. Storage container 122 houses solvent, for example, carbon dioxide, under pressure and is maintained at a temperature to assure delivery of solvent in a liquid phase to pump 64. In another embodiment, pump 64 is a compressor. Treatment vessel 62 is also connected to separation and recovery station 142 through line 144 and valve 146. Separation and recovery station 142 is vented to atmosphere or may be optionally connected to storage container 122 for recovering $CO_2$.

Untreated base membrane 22 is processed by first rolling a predetermined amount of base membrane 22 onto a core 180. The ends of the roll of base membrane 22 are secured with known securing mechanisms (not shown) such as clamps to hold base membrane 22. The securing mechanisms (not shown) are sufficiently tightened to prevent axial fluid flow exiting the ends of rolled base membrane 22. Core 180 is made from any suitable material, for example, perforated stainless steel, and includes a multiplicity of radially extending openings.

Core 180 and base membrane 22 are supported in treatment vessel 62 so that membrane 22 does not contact the interior of treatment vessel 62 so fluid can flow around the entire roll of membrane and wet the entire surface area of base membrane 22. Core 180 is attached to a removably securable end cap 184 of treatment vessel 62. Core 180 is shown extending horizontally in FIG. 4. In alternate embodiments (not shown), core 180 and treatment vessel 62 are oriented in a vertical direction or any other orientation. The interior of core 180 is in fluid communication with line 82 through a port P1 in end cap 184.

In operation, a pressure differential in the range of about 1 psi to about 100 psi exists between the inside of core 180 and the outside of the roll of membrane 22. The pressure differential can vary and is a function of fluid flow velocity, roll size, pore size and pore density. Fluid flows from open space 206 in treatment vessel 62 through a port P2 in a second removably securable end cap 212 of treatment vessel 62 into treatment vessel outlet line 66.

To coat base membrane 22, coating material 24 is placed in treatment introduction vessel 88. The amount of coating material 24 depends on the solution concentration desired in the system and the target predetermined add-on weight deposited on membrane 22. Core 180 and roll of membrane 22 are placed in treatment vessel 62 and connected to end cap 184 for fluid flow through the core and membrane. End caps 184 and 212 are secured to seal treatment vessel 62. Membrane 22 is made from a material that does not dissolve in the selected fluid solvent, for example, carbon dioxide.

Valve 146 is closed and valve 126 is positioned to allow fluid flow to the system. Solvent, for example, carbon dioxide, flows from storage container 122 into treatment vessel 62 and the rest of coating system 60 at the storage pressure. Valve 104 is opened. Pump 64 then fills lines 102, 82, 66 and vessel 62 while increasing system pressure. Valve 126 is positioned to block flow from container 122 and permit circulating flow between pump 64 and treatment vessel 62. Pump 64 raises the pressure in the system to a predetermined pressure. Pump 64 continues to cycle solvent, through line 102, through treatment introduction vessel 88, and line 82 and through treatment vessel 62.

The coating material 24 is exposed to the solvent when the solvent flows through treatment introduction vessel 88. Coating material 24 in treatment introduction vessel 88 is entrained or is dissolved in the solvent flowing through it at the predetermined conditions. Any suitable fluid capable of entraining coating material 24 under predetermined conditions can be used and the use of a co-solvent can be employed. In the exemplary embodiment, supercritical carbon dioxide is used. Flow through vessel 88 continues until the desired concentration of coating material 24 solute in the solution is attained. This flow is maintained until a predetermined amount of coating material 24 in treatment introduction vessel 88 is dissolved to obtain a predetermined amount of treatment material entrained in the solvent.

System pressure is controlled to reach a predetermined pressure. The temperature and pressure of the circulating solution is controlled as determined by the solubility of coating material 24 in the solvent so the coating material dissolves for a predetermined solute concentration. Pressure and volume of solvent can be increased in a known manner by a make-up supply and pump (not shown).

Once the predetermined concentration of coating material 24 in the solution is reached and the system pressure and temperature stabilize, the solution is circulated through the system for a predetermined time. By way of example, the solution circulates through pump 64, treatment introduction vessel 88, temperature control device 84, line 82, through end cap 184, into the interior of core 180, through pores 46 in the roll of membrane 22, into space 206 in treatment vessel 62, through cap 212, through line 66 and then back to pump 64. This assures that every pore 46 in the roll of base membrane 22 is exposed to the solution.

When the solution circulates for sufficient time at the predetermined system conditions, pump 64 is stopped. The pressure and/or temperature of the solution are/is then permitted to change to a condition in which coating material 24 is no longer soluble in the supercritical carbon dioxide. Coating material 24 then precipitates out of the solution and is deposited onto membrane 22. The pressure is then further reduced to 1 atmosphere so treatment vessel 62 can be opened. The coating material 24 is deposited onto substantially all the surfaces of nodes 42 and fibrils 44 defining pores 46 in porous base membrane 22.

While the invention has been described in terms of various specific embodiments, those skilled in the art will recognize that the invention can be practiced with modification within the spirit and scope of the claims.

What is claimed is:

1. A method of making a composite membrane with ion exchange properties, said method comprising the steps of:
   providing a porous base membrane comprising a plurality of pores and made from a first material;
   dissolving a coating material in a fluid comprising a densified gas, the coating material selected from the group consisting of fluorinated vinyl-based copolymers having sulfonyl functionality, fluorinated acrylic-based copolyrners having at least one of hydroxyl groups, acid groups, sulfonyl groups, and sulfonic acid groups, and fluorinated styrenic-based copolymers having at least one of hydroxyl groups, acid groups, sulfonyl groups, and sulfonic acid groups;
   exposing the porous base membrane to the coating material dissolved in the densified gas;
   depositing a uniform coating of the coating material onto surfaces defining the pores in the porous base membrane by changing conditions of the fluid to below a solubility limit of the coating material in the fluid; and
   applying an ion exchange material to the coated porous membrane so that the ion exchange material is in contact with substantially all of the coated surfaces of the porous base membrane, the ion exchange material substantially incompatible with the first material of the porous base membrane, the coating material substantially compatible with the first material and the ion exchange material.

2. A method in accordance with claim 1 wherein the first material comprises at least one of expanded polytetrafluoroethylene, woven polytetrafluoroethylene, non-woven polytetrafluoroethylene, and polyphenelene sulfone.

3. A method in accordance with claim 2 wherein the first material comprises expanded polytetrafluoroethylene, said providing a porous base membrane comprises extruding polytetrafluoroethylene and stretching the extruded polytetrafluoroethylene to form a plurality of nodes and fibrils defining a plurality of interconnecting pores extending therethrough.

4. A method in accordance with claim 3 wherein said applying an ion exchange material comprises applying an ion exchange material to the coated porous base membrane so that the ion exchange material substantially fills the pores of the porous base membrane and is in intimate contact with substantially all of the coated surfaces of the porous base membrane.

5. A method in accordance with claim 1 further comprising chemically treating the coated surfaces of the porous base membrane to convert sulfonyl groups to sulfonic acid groups.

6. A method in accordance with claim 1 wherein said applying an ion exchange material to the coated porous base membrane comprises applying an ion exchange material selected from the group consisting of a sulfonated polystyrene, sulfonated styrene grafted to polyvinylidene difluoride-based polymers, a sulfonated polyethersulfone, a sulfonated poly(ether etherketone), a sulfonated poly(phenylene sulfide), and a perfluorinated ionomer containing sulfonic or carboxylic ionic functional groups to the coated porous base membrane.

7. A method in accordance with claim 1 wherein the coating has a uniform thickness in the range of about 1.0 nanometer to about 500 nanometers.

8. A method in accordance with claim 1 wherein said coating has a uniform thickness in the range of about 1.0 nanometer to about 100 nanometers.

9. A method in accordance with claim 3 wherein a coating thickness to fibril thickness comprises about 0.2 percent to about 20 percent.

10. A method of making a proton exchange membrane for a fuel cell, said method comprising:
    providing a porous base membrane comprising a plurality of pores and made from a first material;
    entraining a coating material in a fluid comprising a densified gas, the coating material selected from the group consisting of fluorinated vinyl-based copolymers having sulfonyl functionality, fluorinated acrylic-based copolymers having at least one of hydroxyl groups, acid groups, sulfonyl groups, and sulfonic acid groups, and fluorinated styrenic-based copolymers having at least one of hydroxyl groups, acid groups, sulfonyl groups, and sulfonic acid groups;
    exposing the porous base membrane to the coating material entrained in the densified gas;
    depositing a uniform coating of the coating material onto surfaces defining the pores of the porous base membrane by changing conditions of the densified gas to below a solubility limit of the coating material in the densified gas; and
    applying an ion exchange material to the coated porous membrane so that the ion exchange material is in contact with substantially all of the coated surfaces of the porous base membrane, the ion exchange material substantially incompatible with the first material of the porous base membrane, the coating material substantially compatible with the first material and the ion exchange material.

11. A method in accordance with claim 10 wherein the first material comprises at least one of expanded polytetrafluoroethylene, woven polytetrafluoroethylene, non-woven polytetrafluoroethylene, and polyphenelene sulfone.

12. A method in accordance with claim 11 wherein the first material comprises expanded polytetrafluoroethylene, said providing a porous base membrane comprises extruding polytetrafluoroethylene and stretching the extruded polytetrafluoroethylene to form a plurality of nodes and fibrils defining a plurality of interconnecting pores extending therethrough.

13. A method in accordance with claim 12 wherein said applying an ion exchange material comprises applying an ion exchange material to the coated porous base membrane so that the ion exchange material substantially fills the pores of the porous base membrane and is in intimate contact with substantially all of the coated surfaces of the porous base membrane.

14. A method in accordance with claim 10 further comprising chemically treating the coated surfaces of the porous base membrane to convert sulfonyl groups to sulfonic acid groups.

15. A method in accordance with claim 10 wherein said applying an ion exchange material to the coated porous base membrane comprises applying an ion exchange material selected from the group consisting of a sulfonated polystyrene, sulfonated styrene grafted to polyvinylidene difluoride-based polymers, a sulfonated polyethersulfone, a sulfonated poly(ether etherketone), a sulfonated poly(phenylene sulfide), and a perfluorinated ionomer containing sulfonic or carboxylic ionic functional groups to the coated porous base membrane.

16. A method in accordance with claim 10 wherein the coating has a uniform thickness in the range of about 1.0 nanometer to about 500 nanometers.

17. A method of making a composite membrane, said method comprising:
    providing a porous base membrane comprising a plurality of pores and made from a first material;
    entraining a coating material in a fluid comprising a densified gas;
    exposing the porous base membrane to the coating material entrained in the densified gas; and
    depositing a uniform coating of the coating material onto surfaces defining the pores of the porous base membrane by changing conditions of the densified gas to below a solubility limit of the coating material in the densified gas;
    the coating material comprising at least one of fluorinated vinyl-based copolymers having sulfonyl functionality, fluorinated acrylic-based copolymers having at least one of hydroxyl groups, acid groups, sulfonyl groups, and sulfonic acid groups, and fluorinated styrenic-based copolymers having at least one of hydroxyl groups, acid groups, sulfonyl groups, and sulfonic acid groups and applying an ion exchange material to the coated porous membrane so that the ion exchange material is in contact with substantially all of the coated surfaces of the porous base membrane, the ion exchange material substantially incompatible with the first material of the porous membrane, the coating material substantially compatible with the first material and the ion exchange material.

* * * * *

UNITED STATES PATENT AND TRADEMARK OFFICE
CERTIFICATE OF CORRECTION

PATENT NO.        : 7,588,796 B2                                         Page 1 of 1
APPLICATION NO.   : 11/077652
DATED             : September 15, 2009
INVENTOR(S)       : Klare et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this

Twenty-first Day of September, 2010

David J. Kappos
*Director of the United States Patent and Trademark Office*